United States Patent [19]

Rawlins

[11] 4,289,264

[45] Sep. 15, 1981

[54] UNIFORM LOAD PISTON RING

[75] Inventor: James J. Rawlins, Palm Beach Gardens, Fla.

[73] Assignee: The United States of America as represented by the Secretary of the Air Force, Washington, D.C.

[21] Appl. No.: 23,416

[22] Filed: Mar. 23, 1979

[51] Int. Cl.³ .............................................. F16K 41/00
[52] U.S. Cl. ..................................... 277/27; 277/173; 277/216
[58] Field of Search ................... 277/83, 27, 173-177, 277/208, 216

[56] References Cited

U.S. PATENT DOCUMENTS

| | | |
|---|---|---|
| 115,463 | 5/1871 | Hall et al. . |
| 2,912,292 | 10/1959 | Lawitschka ........................ 277/208 |
| 2,970,023 | 1/1961 | Thompson . |
| 3,271,037 | 9/1966 | Hammond ............................ 277/27 |
| 3,315,968 | 4/1967 | Hanlon ................................. 277/27 |
| 3,456,954 | 7/1969 | Prasse et al. . |
| 3,462,159 | 9/1969 | Baumann et al. ..................... 277/83 |
| 3,704,893 | 12/1972 | Hill . |
| 3,743,303 | 7/1973 | Pope .................................... 277/173 |
| 3,887,198 | 6/1975 | McClure .............................. 277/27 |
| 4,053,165 | 10/1977 | Hartley ............................... 277/140 |

FOREIGN PATENT DOCUMENTS 14314 9/1933 Australia ............................ 277/216

Primary Examiner—Robert I. Smith
Attorney, Agent, or Firm—Donald J. Singer; Jacob N. Erlich

[57] ABSTRACT

A piston ring which provides uniform circumferential pressure loading on the ring. The ring has two protrusions, and an optional third protrusion, which give full and uniform sealing contact between the ring, and a complementary peripheral groove in an associated piston, or housing, and a complementary cylinder movable wall, or sleeve, so that minimum pressure balance is sacrificed irrespective of any movement of the cylinder wall.

1 Claim, 5 Drawing Figures

UNIFORM LOAD PISTON RING

STATEMENT OF GOVERNMENT INTEREST

The invention described herein may be manufactured and used by or for the Government for governmental purposes without the payment of any royalty thereon.

BACKGROUND OF THE INVENTION

This invention relates to a piston ring and, more particularly, to a pressure-balanced piston ring (i.e., one that is stabilized in position by pressure).

In any application where some lateral outward movement of the cylinder (e.g., the movable sleeve thereof in a bearing compartment) can occur, the pressure load on the piston ring can vary markedly around its circumference (i.e., periphery). This is especially true of pressure-balanced piston rings, and will be shown and described later herein with reference to FIG. 1 of the drawings.

Suffice it to say that, in the art, there exists the inherent problem of imbalance of "pressure-balanced" piston rings.

My inventive piston ring obviates this problem; and, thereby, significantly advances the state-of-the-art.

SUMMARY OF THE INVENTION

With reference to FIG. 1, (wherein axial and radial directions are legended and shown by directional arrows), my invention pertains to a unique uniform load piston ring which results in my piston ring being uniformly loaded and thereby held in the much-desired and long-sought stable position, when in combination with: a piston, or a housing such as 10, having a peripheral groove 11 with a first 12A and a second 12B radially-extending surfaces, and a first 13A and a second 13B axially-extending peripheral face; a cylinder 20 or sleeve (movable relative to the piston or housing), surrounding the piston 10 and having an axially-extending inner peripheral face 21 that is in spaced-apart relationship with, and to, the first 13A and second 13B axially-extending peripheral faces of the piston or housing 10; and, a fluid under high pressure (from a source that is not shown) entering (i.e., directed into) an annular gap (i.e., an annular passage) "G" of predetermined width which is located between the axially-extending inner peripheral face 21 of the cylinder 20 and the first 13A and second 13B axially-extending peripheral faces of the piston 10.

Accordingly, the principal object of this invention is to teach the structure of, and thereby provide a preferred embodiment of, my above-described uniform load piston ring.

Another object is to provide a variation of my inventive uniform load piston ring.

These objects, as well as other related objects, of this invention will become readily apparent after a consideration of the description of the invention, together with reference to the Figures of the drawings.

DESCRIPTION OF THE PREFERRED EMBODIMENT

Figure 1:
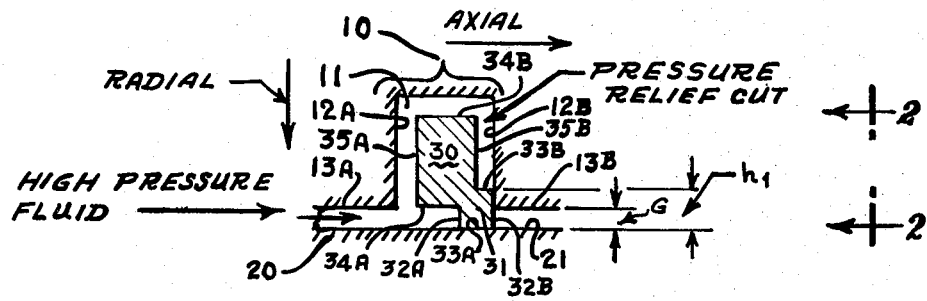
FIG. 1 is a side elevation view, in simplified schematic form and in cross section, of a prior art piston ring, in its working environment.

As a preliminary matter, reference is made to FIG. 1 and to the "Background" portion therein. It is to be noted that the typical prior art piston ring 30, as shown in FIG. 1, has a protrusion 31 that, in a top plan view, is annular-shaped, although the ring 30 is not shown in that view in this Figure; and that the protrusion 31 extends radially to face 21 of cylinder 20; and also, that the protrusion 31 extends axially to surface 12B of piston groove 11. Additionally, the protrusion 31 has a first radially-extending surface 32A that is the same width as the width of gap "G", which said gap is located between face 21 of cylinder 20 and faces 13A and 13B of piston 10; and, the protrusion 31 has a second radially-extending surface 32B. Further, if there is a lateral movement (i.e., a radial movement) of the cylinder wall 21 (or, more appropriately, of the movable cylinder sleeve), the annular gap "G" will vary in width (as viewed from the top), and the pressure load on the piston ring 30 will vary markedly around its circumference (i.e., periphery), with the axial load being the greatest where the gap "G" is the widest. The result is an unbalanced (i.e., tilted and/or wavy) piston ring that is not making the intended, desired, and "hoped-for" full and uniform contact. Furthermore this non-uniform axial load manifests itself, through friction against surfaces 32B, and 12B in an uneven radial resistance, which can resist self centering of a displaced cylinder 20 or bearing compartment sleeve.

Figure 2:
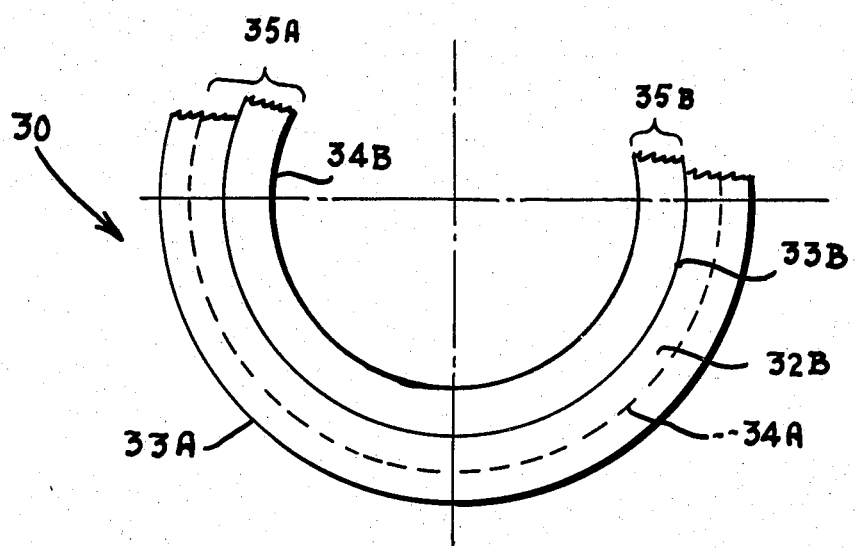
FIG. 2 is a top plan view, in simplified schematic form and partially fragmented, only of the prior art piston ring shown in FIG. 1, principally as seen along line 2—2.

With reference to FIG. 2, there is shown in top plan view, and in partially fragmented form, only the prior art piston ring 30, FIG. 1, principally as seen along line 2—2 of FIG. 1. As can be seen, the ring 30 is annular, and has axial edge surfaces 33A, 33B, 34A and 34B and has radial surfaces 32A, 32B, 35A and 35B.

Figure 3:
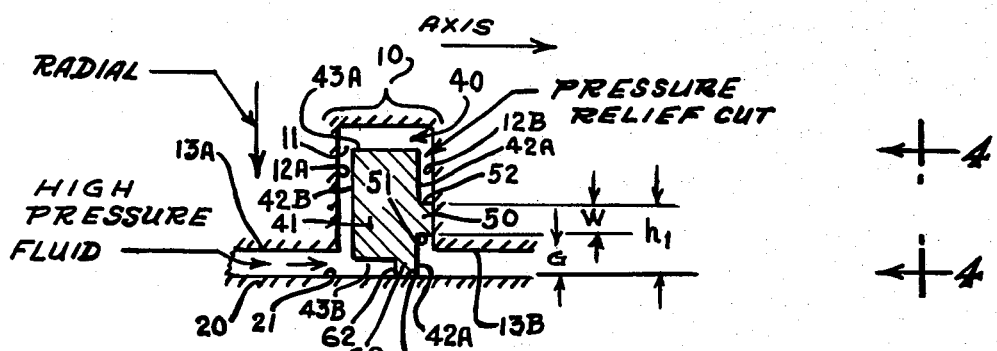
FIG. 3 is a side elevation view, in simplified schematic form and in cross section, of a preferred embodiment of my uniform load piston ring, in its working environment, which is the same environment as is shown in FIG. 1 for the prior art piston ring.
Figure 4:
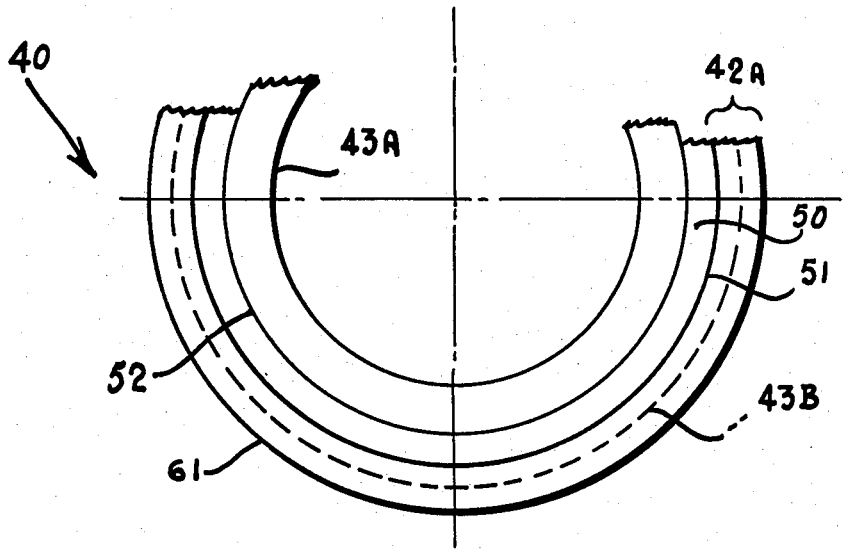
FIG. 4 is a top plan view, in simplified form and partially fragmented, only of the preferred embodiment of my invention that is shown in FIG. 3, principally as seen along line 4—4.

Now, with reference to FIGS. 3 and 4, therein is shown a preferred embodiment 40 of my inventive uniform load piston ring which comprises a ring body 41 having:

a. a first radial surface 42A extending from internal of the piston peripheral groove 11, and across the annular gap (an annular passage) "G", to the inner peripheral face 21 of the cylinder 20;

b. a second radial surface 42B in parallel spaced-apart relationship with, and to, the first radial surface 42A of the ring body 41, and extending from internal of the piston peripheral groove 11 to a location (i.e., a position) within the annular gap (or annular passage) "G";

c. a first axial surface 43A which bounds the first and second radial surfaces 42A and 42B of the ring body 41 internal of (i.e., within) the peripheral groove 11 of the piston or housing 10;

d. a second axial surface 43B that bounds the first and second radial surfaces 42A and 42B of the ring body 41 external of (i.e., outside of) the piston peripheral groove 11, and that is located (i.e., positioned) within the annular gap (or annular passage) "G" in which the fluid is acting under high pressure;

e. a first protrusion 50, that is annular-shaped and has an outer peripheral surface 51 and an inner peripheral surface 52, and which said protrusion 50 extends axially from the first radial surface 42A of the ring body 41 to, and abuts with, the second radially-extending surface 12B of the piston or housing peripheral groove 11, with this first protrusion 50 positioned internal (i.e., within) of the groove 11 and in parallel spaced-apart relationship with, and to, the second axially-extending peripheral face 13B of piston 10, and also with and to the axially-extending inner peripheral face 21 of the cylinder or sleeve 20;

f. and, a second protrusion 60, that also is annular-shaped and that also has an outer peripheral face 61 and a radial peripheral surface 62, and which said protrusion 60 extends radially from the second axial surface 43B of the ring body 41 to, and abuts with, the axially-extending inner peripheral face 21 of the cylinder or sleeve 20.

Figure 5:
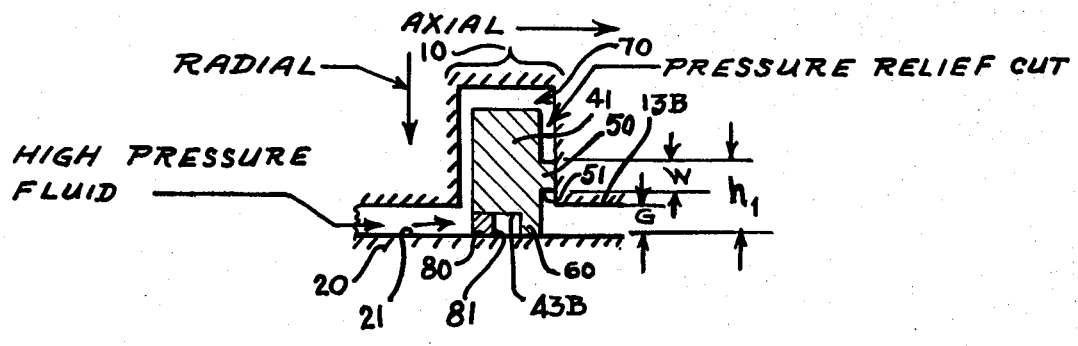
FIG. 5 is a side elevation view, in simplified form and in cross section, of a variation of the preferred embodiment of my invention which is shown in FIGS. 3 and 4.

Now, with reference to FIG. 5, therein is shown, in simplified side elevation view and in cross section, a variation 70 of the preferred embodiment 40 of my inventive uniform load piston ring. The variation 70 structurally has not only the first protrusion 50 and the second protrusion 60, but also has a third protrusion 80, that is annular-shaped and that has an outer peripheral face 81. This protrusion may or may not contain vent holes or grooves which serve the purpose of allowing the fluid to act against surface 62. This third protrusion 80 extends radially from the second axial surface 43B of the piston ring body 41 to, and abuts with, the axially-extending peripheral face 21 of the cylinder or sleeve 20. This third protrusion 80 is structurally a redundant (or "back-up") stabilizer lip, in the highly unlikely event that it is needed.

MANNER OF OPERATION OF THE PREFERRED EMBODIMENT AND VARIATION

The manner of operation of the preferred embodiment 40, FIGS. 3 and 4, and of the variation 70, FIG. 5, can be easily ascertained by any person of ordinary skill in the art from the foregoing description, coupled with reference to the Figures of the drawings.

For others, it is sufficient to say in explanation that, if there is a lateral movement (i.e., a radial movement) of the cylinder wall 21 (or, more appropriately, of the movable cylinder sleeve portion of the cylinder wall 21), and the annular gap (or annular passage) "G" in fact becomes eccentric, there will be no change in the downstream pressure balance area with circumferential position. Hence the axial load all around the periphery will remain constant, maintaining the ring body 41 in a uniformly-loaded, balanced and stable position, in spite of the local widening of annular gap (or annular passage) "G". Stated another way, the unique structure of my ring body guarantees full and uniform sealing contact of the piston ring and of the piston or housing wall at area "W", FIGS. 3 and 5. Dimensions are chosen to minimize the height "$h_1$", so that minimum pressure balance is sacrificed and so that surface 51 is never permitted to fall outboard of surface 13B.

It is abundantly clear from all of the foregoing, and from the Figures of the drawings, that the stated desired objects of the invention, as well as other related objects, have been attained.

It is to be noted that, although there have been described the fundamental and unique features of my invention, as applied to a preferred embodiment and a variation thereof, various other embodiments, variations, adaptations, substitutions, additions, omissions, and the like may occur to, and can be made by, those of ordinary skill in the art, without departing from the spirit of my invention.

What is claimed is:

1. A uniform circumferential load piston ring (40), in combination with a piston (10) having a peripheral groove (11) with a downstream radially-extending wall (12B) forming one surface upon which said piston ring (40) will contact in a sealing manner; a cylinder (20) coaxially oriented with and surrounding said piston (10), with said cylinder (20) having an axially-extending peripheral surface (21) forming another surface upon which said piston ring (40) will contact in a sealing manner, wherein said piston (10) and said cylinder (20) are movable relative to each other; and, a fluid under high pressure in an annular passage (G) flowing to said groove (11) which is in communication with said passage (G); and, wherein said piston ring (40) comprises a ring body (41) having:
   a. a first protrusion (50) annular-shaped and extending axially from said ring body (40) in a downstream direction and forming an area of sealing contact with said downstream radially-extending wall (12B) of said piston (10), with said protrusion (50) forming a pressure relief cut, and with said protrusion (50) having an axially-extending surface (51) which is located such as to be prevented from entering said annular passage (G);
   b. a second protrusion (60) unsegmented, annular-shaped, and extending radially from said ring body (41), with said second protrusion (60) having an axially-extending surface (61) in contact with and forming a seal with said axially-extending inner surface (21) of said cylinder (20);
   c. and, a third protrusion (80) annular shaped and extending radially from said ring body (41), with said third protrusion (80) having an axially-extending surface (81) in contact with said axially-extending inner surface (21) of said cylinder (20), and with said third protrusion (80) located axially upstream of said second protrusion (60);
   whereby the inability of said surface (51) of said first protrusion (50) to enter said annular passage (G) assures an area of constant sealing contact between waid first protrusion (50) and said downstream radially-extending wall (12B) of groove (11), despite eccentric shifting and lateral movement between each piston (10) and said cylinder (20), thereby said load caused by said fluid under high pressure is uniformly and circumferentially distributed and exerted on said ring body (41).

* * * * *